United States Patent [19]

Saito et al.

[11] Patent Number: 5,662,575
[45] Date of Patent: Sep. 2, 1997

[54] METHOD AND APPARATUS FOR CONTINUOUSLY FORMING BAGS

[75] Inventors: Hisatoshi Saito, Kawasaki; Masamitsu Yano, Hino; Satoshi Takane, Kawasaki, all of Japan

[73] Assignee: Kewpie Kabushiki Kaisha, Japan

[21] Appl. No.: 959,655

[22] Filed: Oct. 13, 1992

[30] Foreign Application Priority Data

| Oct. 16, 1991 | [JP] | Japan | 3-267841 |
| Oct. 17, 1991 | [JP] | Japan | 3-269599 |
| Oct. 23, 1991 | [JP] | Japan | 3-275776 |
| Nov. 13, 1991 | [JP] | Japan | 3-297485 |

[51] Int. Cl.$^6$ .................................................. B31B 23/16
[52] U.S. Cl. ................... 493/190; 493/206; 493/209; 493/197
[58] Field of Search .................. 493/190, 199–201, 493/203, 204, 206, 209, 193–196

[56] References Cited

U.S. PATENT DOCUMENTS

| 2,638,964 | 5/1953 | Andina | 493/209 |
| 4,030,956 | 6/1977 | Leloux . | |
| 4,642,084 | 2/1987 | Geitman, Jr. | 493/190 |
| 4,662,978 | 5/1987 | Oki | 493/190 |
| 4,692,135 | 9/1987 | Johnson | 493/209 |
| 4,761,197 | 8/1988 | Christine | 493/209 |
| 4,994,137 | 2/1991 | Yanai | 493/209 |

FOREIGN PATENT DOCUMENTS

| 2 627 128 | 8/1989 | France . |
| 812695 U | 10/1990 | Germany . |
| 8201640 | 11/1983 | Netherlands . |

OTHER PUBLICATIONS

Japanese Doc. No. 59-135116 A, Aug. 1984 (abstract only).
Japanese Doc. No. 62-183331 A, Aug. 1987 (abstract only).
Japanese Doc. No. 63-126726 A, May 1988 (abstract only).

Primary Examiner—Jack W. Lavinder
Attorney, Agent, or Firm—Dickstein, Shapiro, Morin & Oshinsky LLP

[57] ABSTRACT

A method for continuously forming bags comprising continuous steps of heat-sealing a continuous tubular plastic film, such as a continuously formed inflation tube or the like, widthwise at given positions thereof while the tubular film is being conveyed, cutting sequentially the tubular film along the heat-seals into bag-shaped containers, and conveying the tubular film over a set distance to a following step while the heat-seals of the heat-sealed tubular film being press-held and cooled. Also the present invention relates to an apparatus for continuously forming bags for heat-sealing a continuous tubular plastic film, such as a continuously formed inflation tube or the like, widthwise at given positions thereof while the tubular film is being conveyed, and then cutting the tubular film along the heat-seals into bag-shaped containers. The apparatus comprises heat-sealing device for sealing the tubular film including a pair of heat-sealing members which are disposed on one side of a track of conveyance of the tubular film, opposing each other so as to hold the tubular film therebetween, and are movable to and from each other, driving device for driving the heat-sealing device to and from each other, cooling device for cooling the tubular film including a pair of cooling sandwiching members which are supported on a movable member disposed movably in directions of width of the tubular film and conveyance thereof, and intrude inbetween the heat-sealing members to sandwich the heat-seals of the tubular film, and driving device for driving the cooling sandwiching members to and from each other, whereby the tubular film is conveyed by a movement of the movable member to a next step with the those parts of the tubular film at the heat seals held between the cooling sandwiching members.

1 Claim, 22 Drawing Sheets

METHOD AND APPARATUS FOR CONTINUOUSLY FORMING BAGS

BACKGROUND OF THE INVENTION

This invention relates to a continuous bag forming method and an apparatus for continuously forming bag-shaped containers from an inflation tube (tubular plastic film).

Plastic containers for sealing various liquid substances, e.g., containers for blood transfusion, have been conventionally formed by blow molding, because such containers have to be deformable. However, in blow molding one container is discontinuously formed in units of one molding. This has the disadvantage of raising costs and of large spaces being required for transportation.

In view of these disadvantages, a recently used method has bag-shaped containers formed of inflation tubes formed in continuous tubes. In this method, an inflation tube is cut into tubes of a required length, and both end openings of each tube of a required length are heat-sealed into a bag-shaped container. Alternatively, an inflation tube is heat-sealed at required parts and is conveyed by a pair of rollers to a next step where the inflation tube is severed at the heat seals, shaped in accordance with use, punched and subjected to other treatments to complete the bag-shaped containers.

However, the former method is difficult to automate and mostly depends on manual labor and as a result, the productivity is low, and dispersion tends to occur in the seal positions and the seal finish. It is a problem that uniform products cannot be produced. In the latter method, an inflation tube is conveyed by a pair of rollers. During its conveyance, tensile strength acts on the inflation tube, elongation occurs in the inflation tube and parts of the inflation tube are softened by heating for forming heat-seals. Resultant deflections take place in severing positions, punching positions and shaping which will follow in the next step. One problem is that precisely uniform products cannot be produced.

In either of these methods, the heat sealing of an tubular film is conducted by pressing heating means in the form of a heater against both sides of the tubular film for melt-adhesion to each other. When both sides of the tubular film are held by the heating means and heat-melted to each other, the melt-adhered parts and parts of the tubular film neighboring the melt-adhered parts or peripheral parts of the tubular film are semi-molten. The molten parts of the tubular film stick to the heating means and elongate the tubular film when the heating means is removed from the tubular film, or cause the tubular film to zigzag on conveyance. This deflects severing positions and punching to be conducted in the following steps. One problem is that precisely uniform bag-shaped containers of high quality cannot be prepared.

In forming bag-shaped containers, e.g., bag-shaped containers for sealing transfusion blood, of a tubular film and which are prepared by heat-sealing a tubular film widthwise at longitudinally set intervals and then severing the tubular film at the heat seals into lay-flat bags with one end open and the other end sealed. As shown in FIG. 27, a plastic cylindrical port a is generally inserted into the open end 1a of a lay-flat bag 1 and is melted onto the bag as the spout of the contained liquid substance when used.

To automate the operation of inserting the port a as described above into the open end 1a of the plastic lay-flat bag 1 and melting the port a onto the bag 1, it is necessary to automatically separate and open the lay-flat open end 1a to admit the port a.

Conventionally, the lay-flat open end 1a is opened rectangularly by putting vacuum pads on the front and the back sides thereof and drawing the vacuum pads apart from each other, and then the port a is inserted into the thus separately-opened end.

This conventional means has the following problems of, for example, in the case that a bag blank is thick, the lay-flat open end cannot be easily separated and opened. Even in the case that the bag blank is thin, it is difficult to separate and open the lay-flat end when a width of the open end is small. The separation and opening position tends to deviate. Especially in the case where a port a is automatically fed into the separated and opened end, the vacuum pads, their accessories, etc. are in the way to the automation.

In inserting the port a into the separated and opened end 1a of the bag 1 and melting the same thereonto conventionally, as shown in FIG. 28, the outer periphery of the port a and the separated and opened end 1a of the bag 1 are concurrently heat-melted onto each other by heating means d, d each having a concavity b contouring to a half circumference of the port a, and flat portions c, c on both sides of a concavity b, which are to abut on the separated and opened end 1a of the bag 1.

However, such conventional melt-adhering means has the following problems. That is, due to a remarkable difference in heat capacity between the port a and the bag 1, melt-adhering conditions differ between the port a and the bag 1. Resultantly cracks and pin-holes take place, and wrinkles occur in the melt-adhered portion. Defective ratios rise as a result.

SUMMARY OF THE INVENTION

This invention has been made taking these problems into consideration. A first object of this invention is to provide a continuous bag forming method and apparatus which can continuously form bag-shaped containers of a tubular film, such as an inflation tube, and enables severing, punching, shaping and other operations at accurate positions without elongating the film.

A second object of this invention is to provide a heat-sealing device which is free from the drawback that when a film is melt-adhered by heaters, the film sticks to the heaters, adversely displacing the film and deforming it.

A third object of this invention is to provide a method and apparatus for automatically separating and opening the open end of a tubular plastic film bag without the use of suction means, such as vacuum pads.

A fourth object of this invention is to provide a method and apparatus for heat-sealing a spout port of a tubular plastic film bag, which can melt-adhere, without failure, the port without occurrences of pin-holes and wrinkles.

BRIEF DESCRIPTION OF THE DRAWINGS

FIG. 2 is a plan view of one embodiment of bag-forming lines this invention is applied to.

DETAILED DESCRIPTION OF THE PREFERRED EMBODIMENTS

Figure 1A:
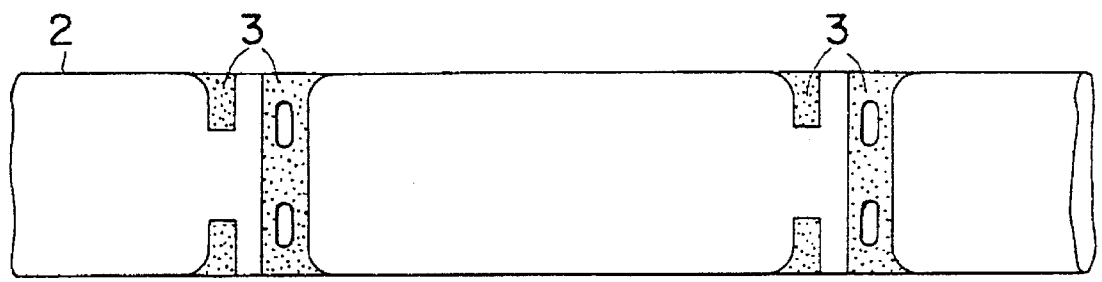
FIG. 1 is a plan view of a tubular film illustrative of one of steps of forming a bag according to this invention, and plan views of a finished product.

This invention will be explained below by means of embodiments of this invention shown in the drawings attached hereto.

Figure 1B:
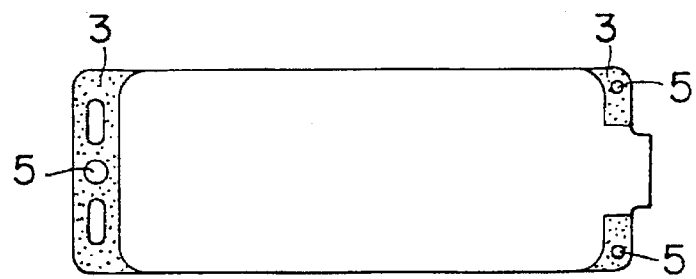
Figure 1C:
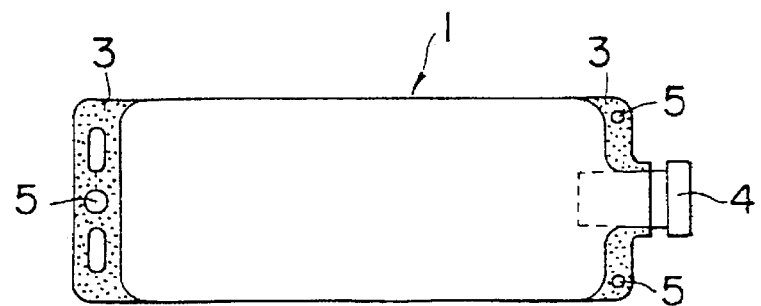

FIG. 1 is views of a bag-shaped container 1 in states corresponding to bag-shaped container forming steps of this invention. FIG. 1A shows an inflation tube 2 (hereinafter called tubular film) in a state where required parts thereof are heat-sealed. FIG. 1B shows the tubular film 1 in a state where the film 2 is punched, severed, shaped and is subjected to other treatments, and FIG. 1C shows a finished bag-shaped container 1 of the tubular film 2. The finished bag-shaped container 1 has both ends heat-sealed 3, 3, and has a cylindrical port 4 of a resin melt-adhered to one of the ends 3, 3. Holes 5,5 are formed in the heat-sealed ends 3, 3 at required positions for suspending the bag-shaped container 1 for use. On the surface of the container 1 are printed a scale and necessary indications.

Figure 2:
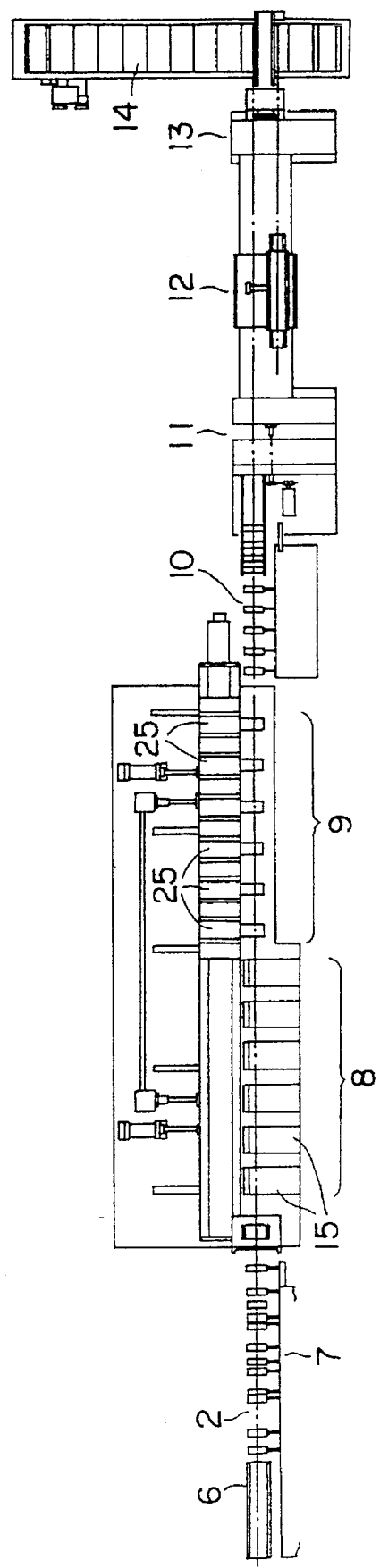
Figure 3:
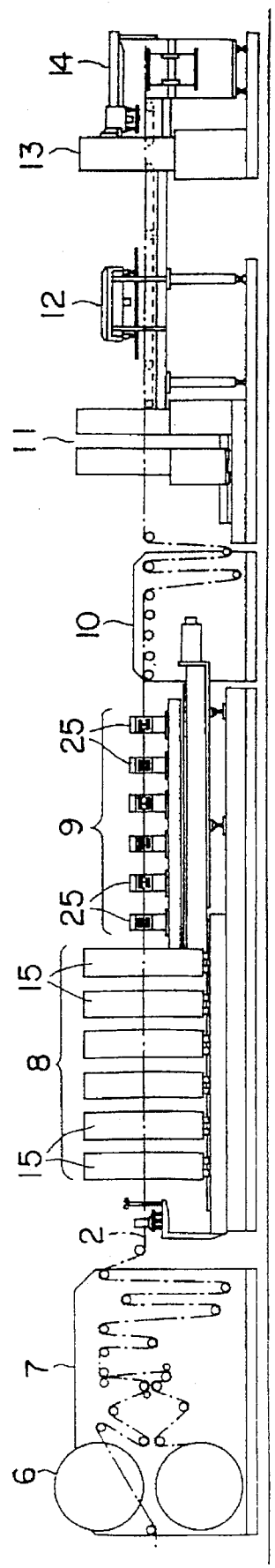
FIG. 3 is a front view of the embodiment of FIG. 2.
Figure 4:
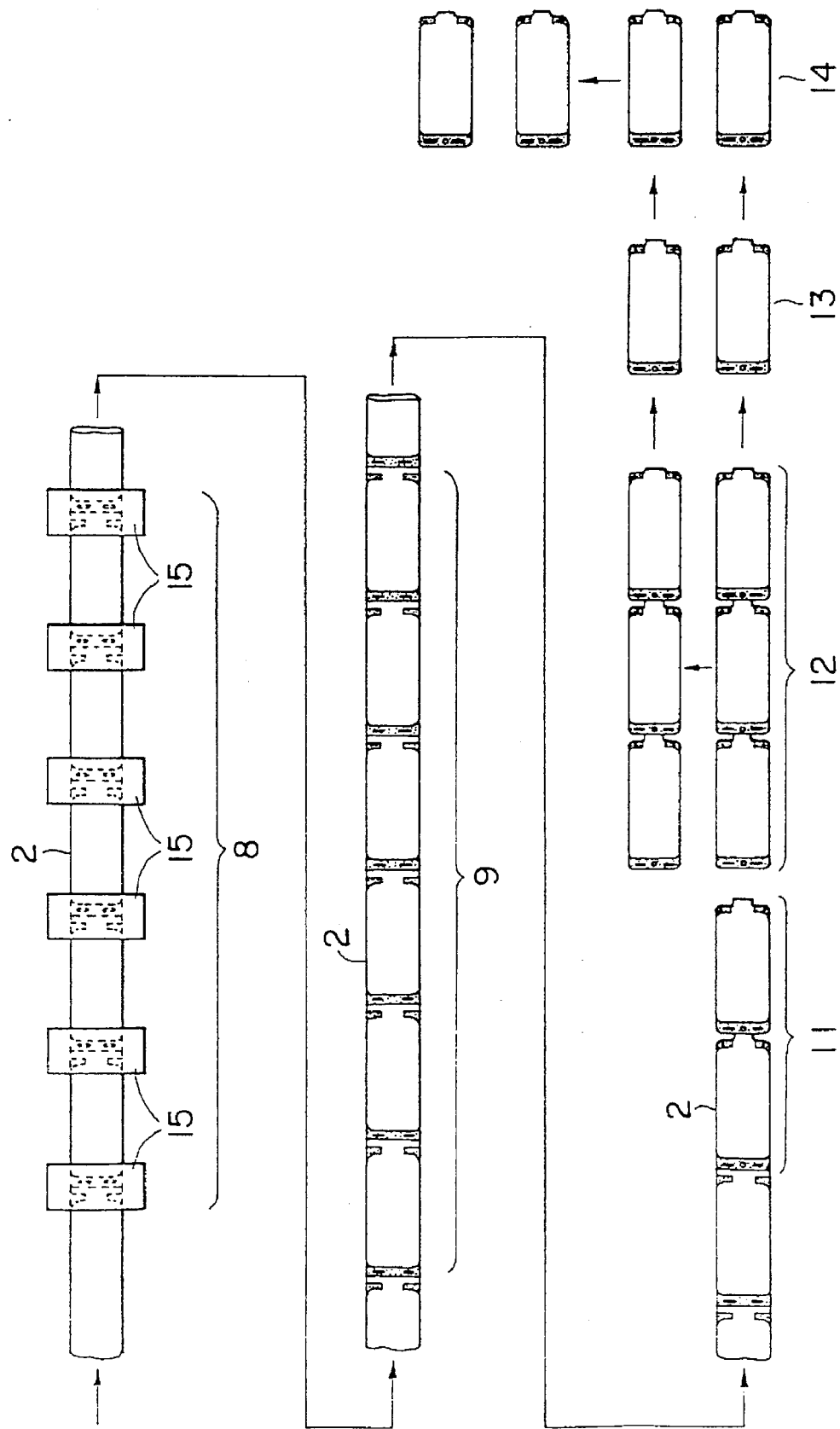
FIG. 4 is a view of states of a tubular film conveyed through a bag forming line.

FIG. 2 is a general schematic plan view of a production line of the bag-shaped container 1. FIG. 3 is a front view of the production line, and FIG. 4 is a flow chart of the tubular film 2 along the production line.

The production line as a whole comprises a tubular film feed unit 7 including dancer rolls and a roll 6 winding the tubular film 2 for feeding the tubular film 2, a heat-sealing unit 8 for heat-sealing the tubular film 2 widthwise at required parts, a cooling unit 9 for conveying the tubular film 2 downstream outside the region of the heat-sealing unit 8, sandwiching and cooling the heat seals, a dancer roll unit 10 disposed downstream of the region of the cooling unit 9, punching and severing means 11 for severing the tubular film 2 at a heat seal by a unit of a plurality of bag-shaped containers (three in the drawings) and following the formation of the heat-seals 3, 3, punching the containers of one unit at required positions following the formation of the heat-seals 3, 3 (see FIG. 1), a double row arranging unit 12 for arranging units of bag-shaped containers into two rows following the severance of the tubular film 1 by the unit, a severing unit 13 for severing the bag-shaped containers of the unit conveyed in the double rows into an individual bag-shaped container and shaping the exteriors of the individual bag-shaped containers, and a conveying unit 14 for conveying the individual bag-shaped containers in a horizontal single row to the above-described step of inserting and melt-adhering ports 4 (see FIG. 1) to the individual bag-shaped containers.

In the embodiment described, the tubular film 2 is conveyed horizontally in the heat-sealing unit 8 and the cooling unit 9.

Figure 6:
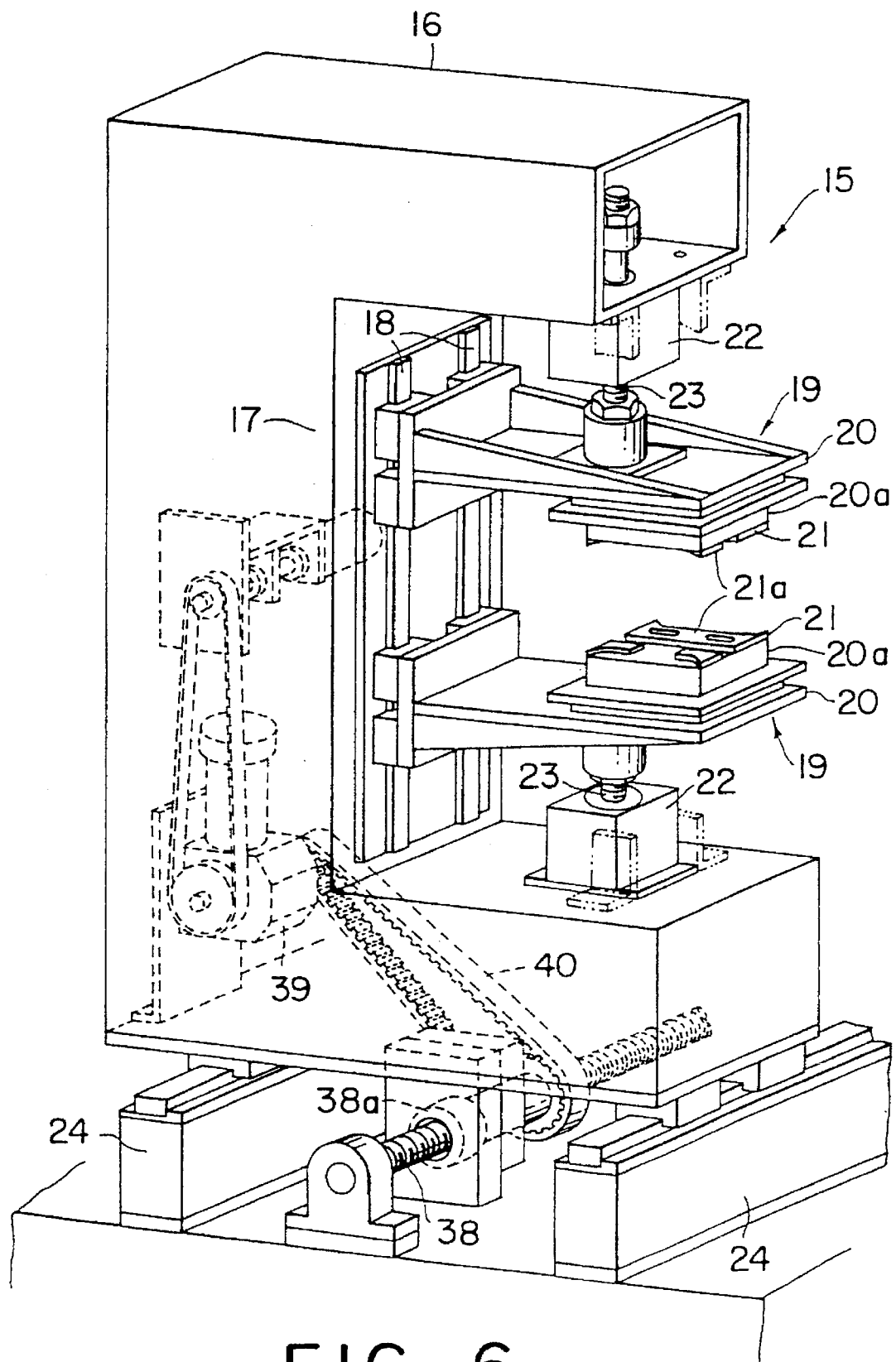
FIG. 6 is a perspective view of heat-sealing means in FIG. 5.
Figure 8:
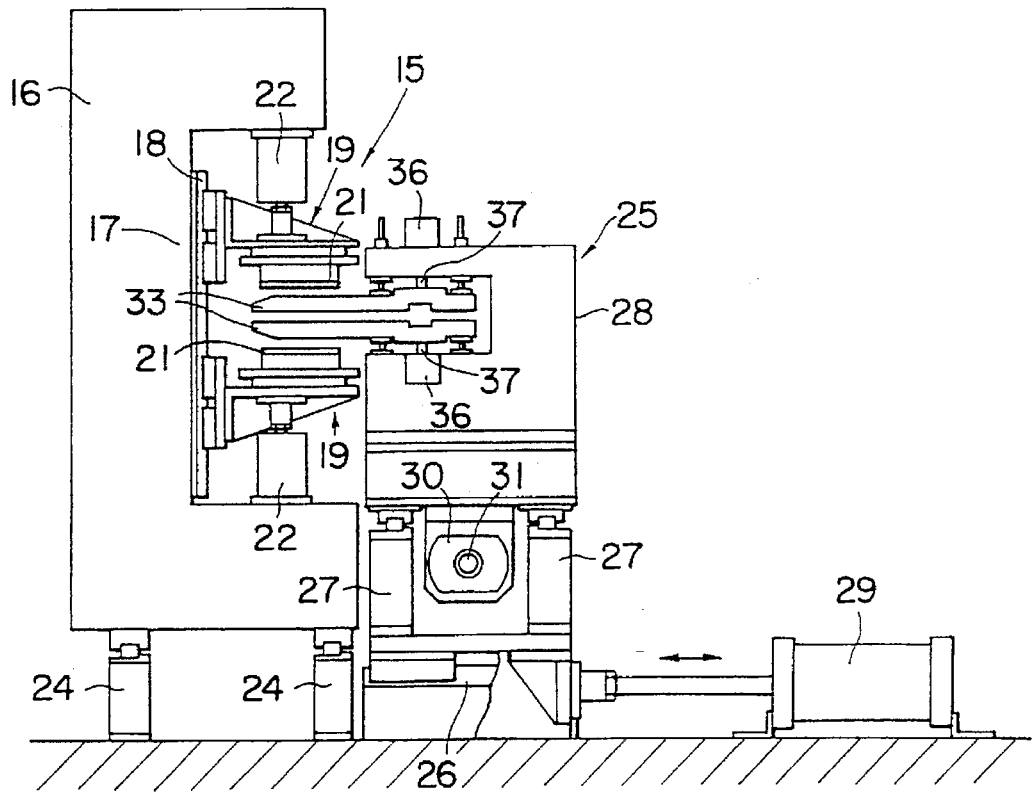
FIG. 8 is a vertical side view of FIG. 5.

Heat-sealing means 15 which is a member of the heat-sealing unit 8 comprises heat-sealing members 19, 19 as shown in FIGS. 6 and 8. The members 19, 19 are supported movably to and from each other on a guide rail 18 provided vertically on an upright part 17 of a bracket-shaped frame 16 whose open side is faced to one side. Each heat-sealing member 19, 19 comprises a cantilevered heater base 20, 20 having the proximal end slidably supported at the proximal end on the guide rail 18, 18, and a heater 21, 21 mounted, through a heat insulating material 20a, 20a, on the surface of the heater base 20, 20 opposed to that of the other heater base 20, 20. A heat-sealing pattern is formed on the surface 21a, 21a of each heater 21, 21.

Figure 5:
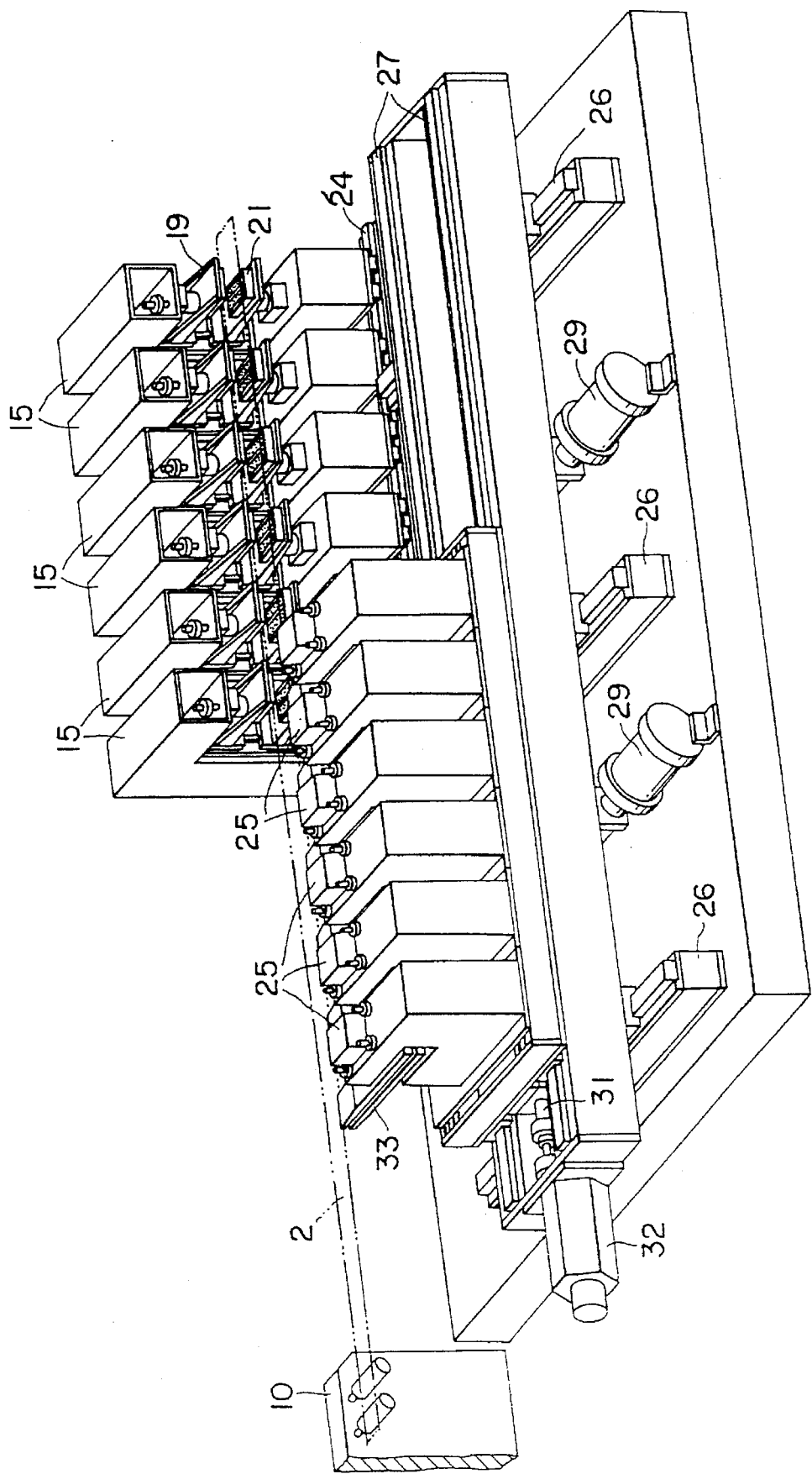
FIG. 5 is a perspective view of a major part of this invention.

A rod 23, 23 of an air cylinder 22, 22 mounted on the frame 16 as driving means is connected to each heat-sealing member 19, 19. The air cylinders 22, 22 are driven to move the heat-sealing members 19, 19 to and from each other. In this embodiment, as shown in FIG. 5, six heat-sealing means 15 are juxtaposed to one another so that the conveyed tubular film 2 is simultaneously heat-sealed for six bag-shaped containers 1. The heat-sealing means 15, 15 will be described in more detail below.

Figure 7:
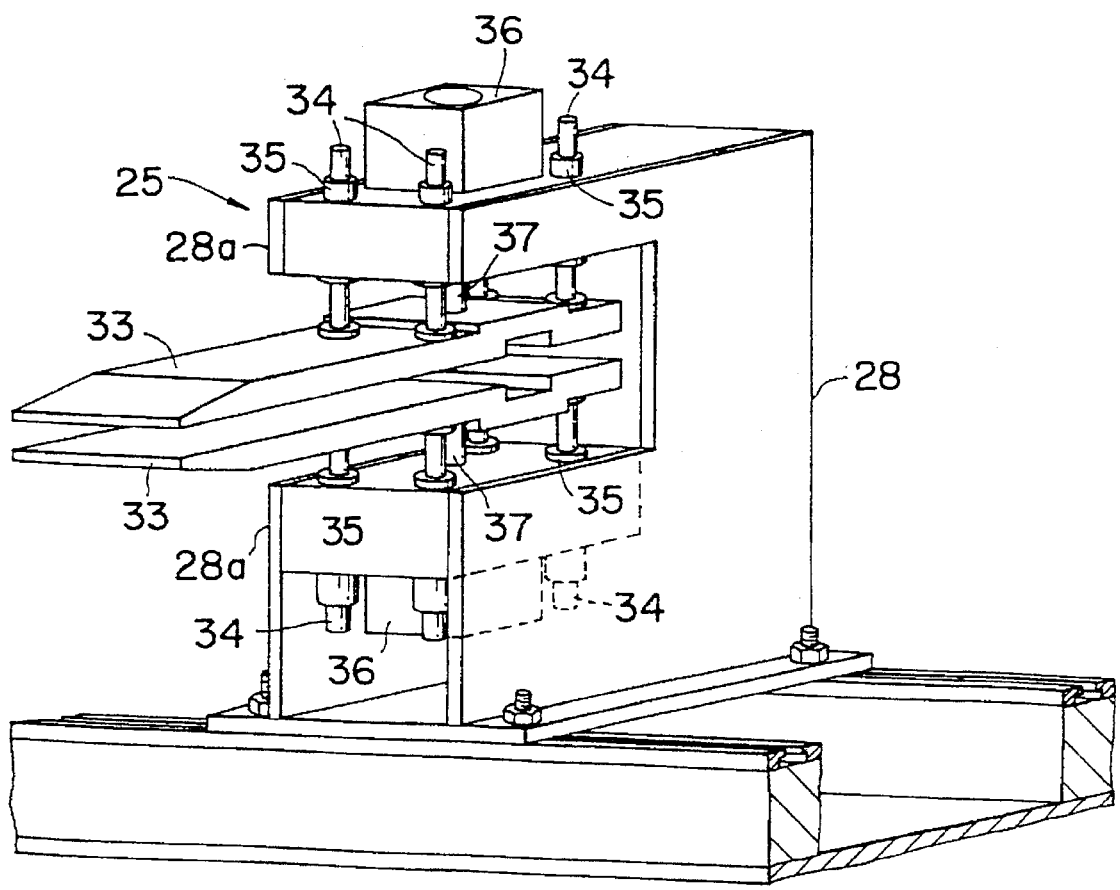
FIG. 7 is a perspective view of cooling means in FIG. 5.

A cooling means 25 which is a member of the cooling unit 9 are provided to engage with heat-sealing members. As shown in FIGS. 5, 7 and 8, a base 27 is mounted on rails 26, 26 provided normal to the row of the heat-sealing means 15, 15 slidably toward the heat-sealing means 15, 15. Movable members 28, 28 are mounted on the base 27 movably in the direction of the row of the heat-sealing means 15, 15, i.e., the same direction of feed of the tubular film 2. The base 27 is moved by air cylinders 29, 29, . . . The internally threaded portion 30 on the underside of each movable member 28 is engaged with a threaded rod 31 journalled in the base 27, and the the threaded rod 31 is rotated clock-wise and counter-clockwise by a motor 32, whereby the base 27 is moved in the direction of feed of the tubular film 2.

Figure 9:
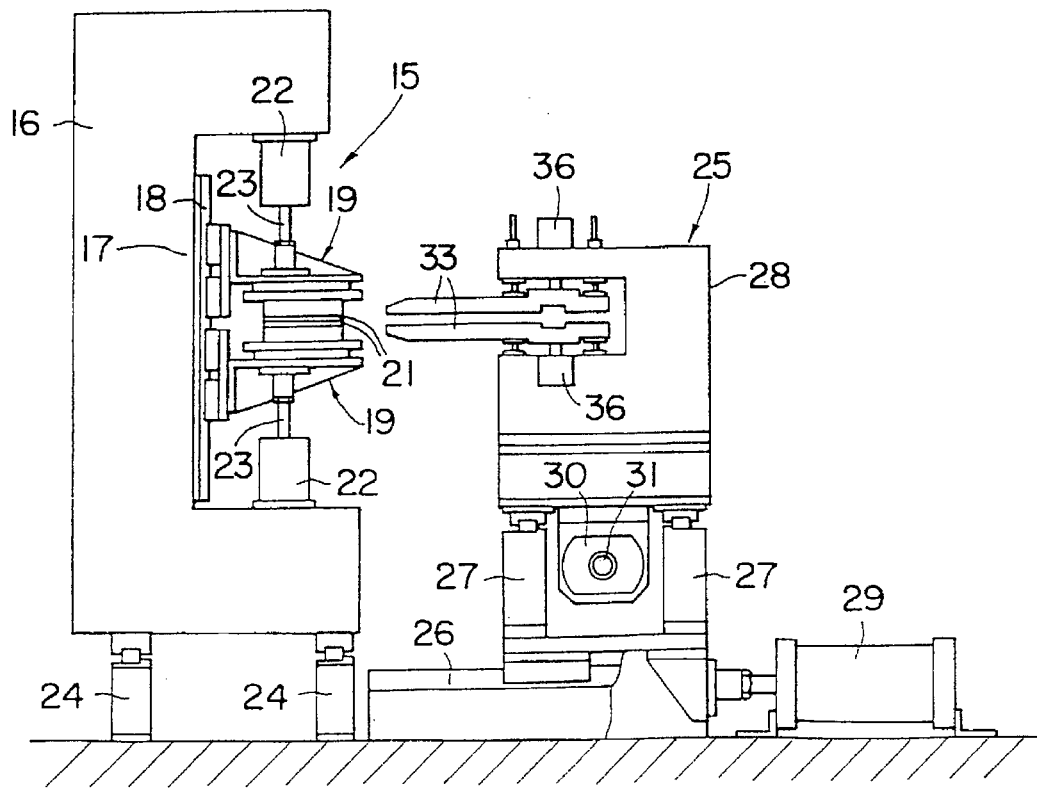
FIG. 9 is a side view of a state of heat-sealing.

Each movable member 28 has a pair of cooling sandwiching members 33, 33 of about 10 mm-thickness steel as shown in FIGS. 7, 8, 9. The members 33, 33 are movable inbetween the heat-sealing members 19, 19 which are apart from each other after a sealing operation is completed. Guide rods 34, 34 secured to the cooling sandwiching members 33, 33 are slidably inserted, through bushes 35, 35, in guide holes formed in each of the arm portions 28a, 28a of a bracket-shaped frame of the movable member 28. The rod 37, 37 of each of air cylinders 36, 36 respectively mounted on the arms 28a, 28a as driving means are connected to the cooling sandwiching members 33, 33. The air cylinders 36, 36 are driven to drive the sandwiching members 33, 33 to and from each other. In the case where the sandwiching members 33, 33 do not structurally provide a sufficient cooling effect, a coolant is circulated through the sandwiching members 33, 33 so as to improve the cooling effect. It is preferable that an interval between heat-sealing means 15 is adjustable so as to change an interval of seals and make adjustments. One embodiment of such arrangements is shown in FIG. 6. In this embodiment, the frame of the heat-sealing means 15 is movably mounted on the base 24, the threaded rods 38 journalled in the base 24 are screw-engaged with the internally threaded portion 38a of the frame 16, and the internally threaded member 38a is rotated by a belt 40 of a motor 39 mounted on the frame 16 so as to move the frame 16.

Figure 10:
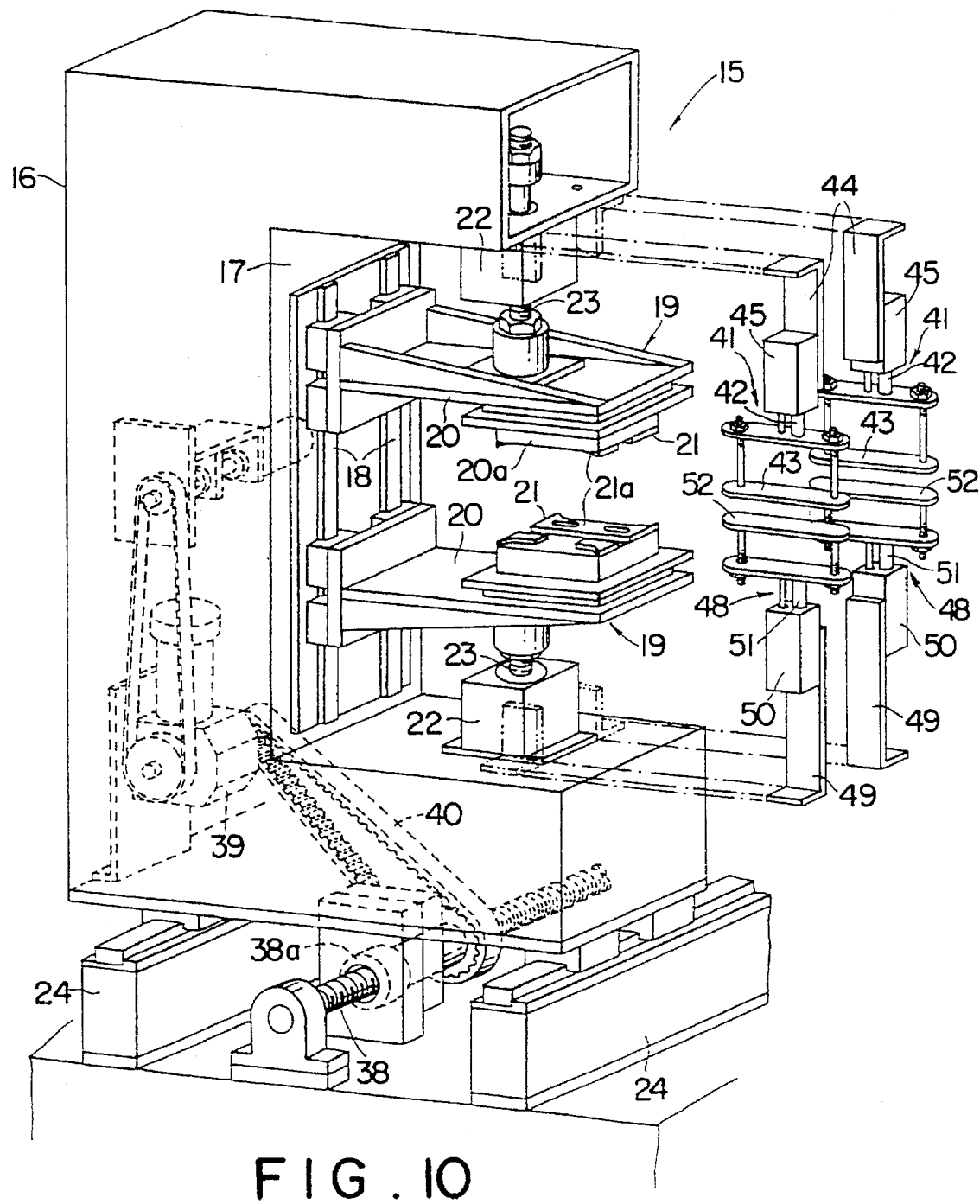
FIG. 10 is a perspective view of details of the heat-sealing means involved in this invention.
Figure 11:
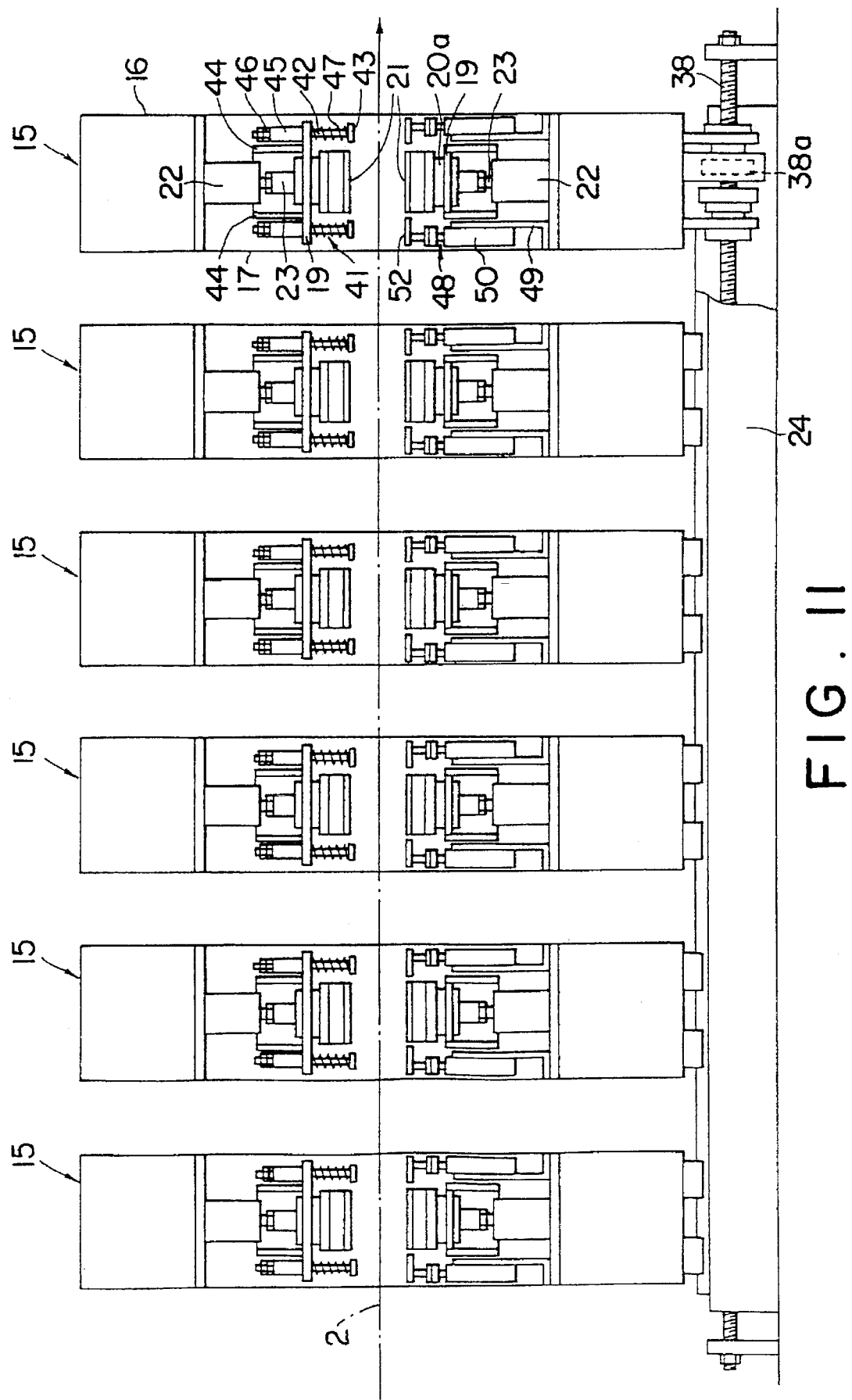
FIG. 11 is a front view of an embodiment in which the heat-sealing means of FIG. 10 are arranged in rows.
Figure 12:
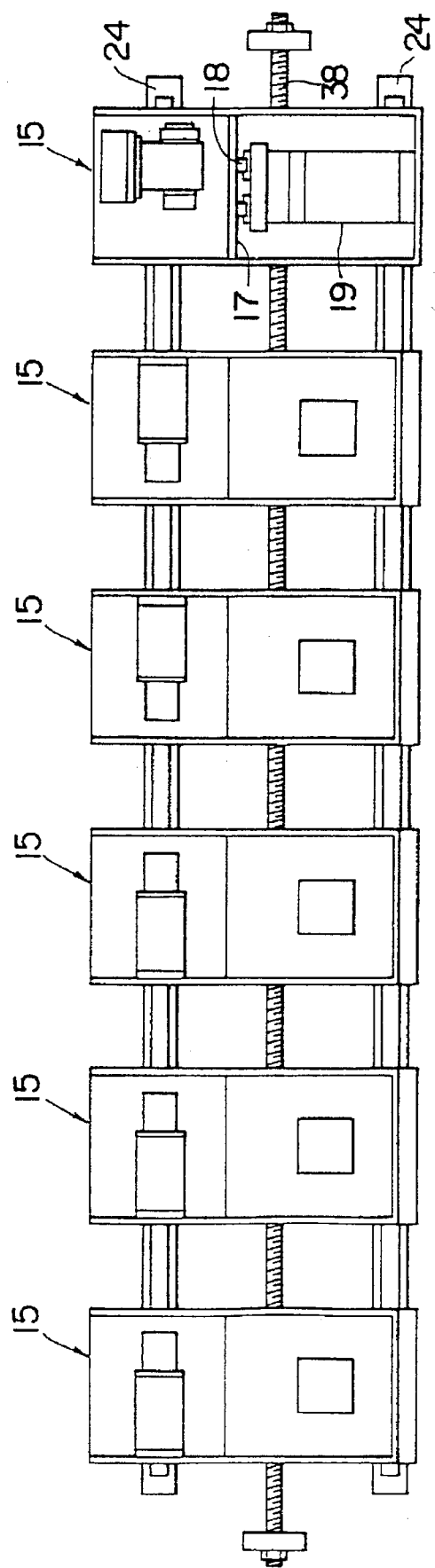
FIG. 12 is a plan view of FIG. 11.

FIGS. 10 to 12 show in details examples of the heat-sealing means 15. An upper heater base 20 is wider than a heater 21. Film pressing members 41, 41 are provided on both sides of the heater 21. As shown in FIGS. 10 and 11, each film pressing member 41 comprises a rod 42, and pressing plate 43 on the lower end of the rod 42. The rod 42 is vertically movably inserted in each of bearing portions 45 mounted on both sides of the top of the heater base 20 through support members 44. A threaded portion of the rod 43 projected from the upper end of the bearing portion 45 is screw-engaged with a nut 46, and the nut 46 determines a lower limit of the pressing member 41. That part of the rod 42 between the pressing plate 43 and the heater base 20 is inserted in a coil spring 47 to urge the pressing plate 43 to project. The underside of the pressing plate 43 takes a position a little lower than the surface 21a of the heater 21. As shown in FIG. 10, the film pressing member 41 may be moved vertically by an air cylinder mounted on the frame 16 through a support member.

A lower heater base 20 is narrower. Film positioning members 48, 48 are provided on both sides of the lower heater base 20. Each positioning member 48, 48 comprises an air cylinder 50 as the driving means supported on a support member 4 secured to the frame 16 and rising therefrom, and a positioning plate 52 secured to the top end of the rod 51 of the air cylinder 50. A timing of the air cylinder 50 is so programmed that the positioning plate 52 is raised a little ahead of the heater 21.

Figure 13:
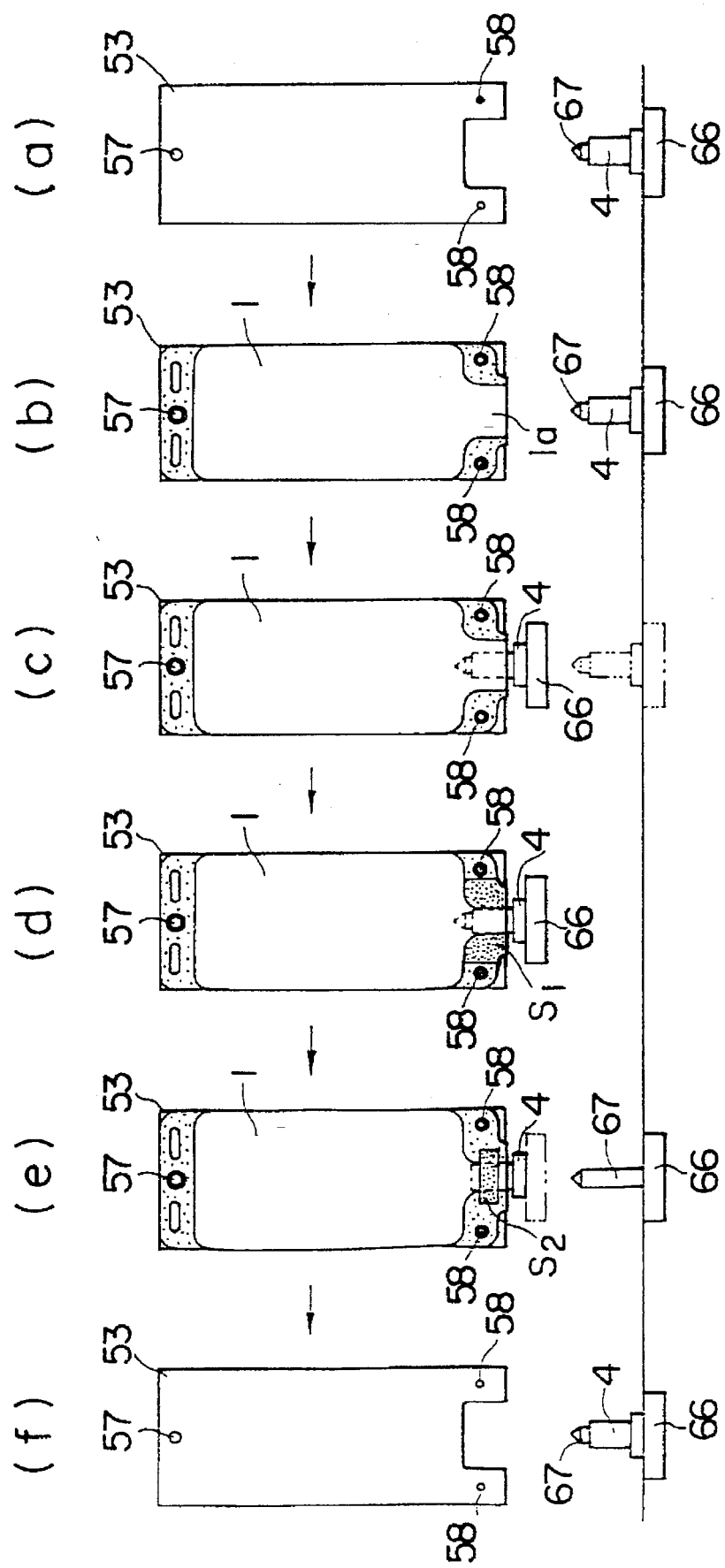
FIG. 13 is a view schematically explaining a port sealing step of this invention.

FIG. 13 schematically shows a heat-sealing process involved in this invention. This process comprises a bag-feeding step (a) for supplying a bag 1 of FIG. 1, an open end separating and opening step (b) for separating and opening the open end 1a of the bag 1, a port inserting step (c), an open end heat-sealing (a first seal) step (d) for heat-sealing those parts of the open end 1a on both sides of the inserted port 4, a port heat-sealing (a second seal) step (e) for heat-sealing the open end 1a to the periphery of the port 4, and a discharging step (f) for discharging the finished bag.

Figure 14:
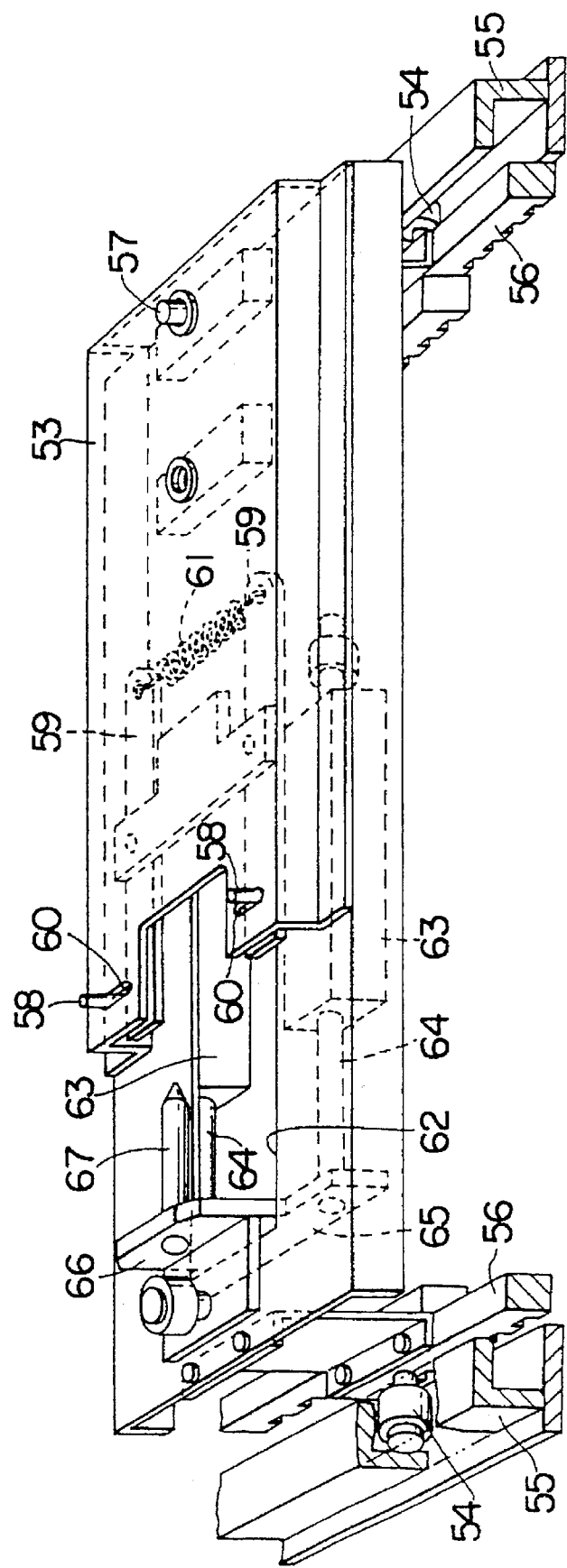
FIG. 14 is a perspective view of one of bag-mounting base.

A bag-mounting table 53 as shown in FIG. 14 which is circulated through the above-described respective steps is movable by means of rollers 54, 54 provided on both longitudinal sides at a certain interval and engaged in rails 55, 55. The table 53 is moved by toothed belts 56, 56 secured to both longitudinal sides wound on toothed pulleys (not shown), and the pulleys are driven to circulate the table in a loop, stopping the same at the above-described respective steps.

Figure 15:
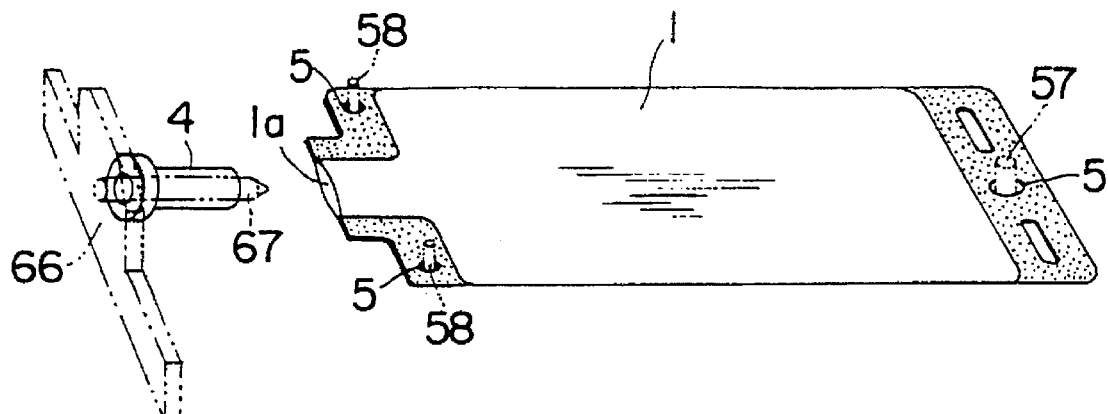
FIG. 15 is a view explanatory of engagement of a bag with the bag-mounting base.

On the top surface of the bag mounting table 53 there are upwardly projected pins 57, 58, 58 which are put into one hole 5 formed in middle of the lower end of the bag 1, and holes 5, 5, formed in the bag 1 at positions near both sides of the open end 1a. FIG. 15 shows a state of the bag 1 with the pins inserted in the holes 5, 5, . . .

The pin 57 for positioning the rear end of the bag 1 is secured to the bag mounting table 53. The pins 58, 58 for positioning the open end of the bag 1 are secured to the forward ends of arms 59, 59 having the middle portions interconnected by a rod on the underside of the bag mounting table 53 and are projected upward through slots 60, 60 extending axially in the bag mounting base 53 as shown in FIG. 14. A tensile spring 61 interconnects the rear ends of the arms 59, 59 so that the pins 58, 58 are biased outward to be brought into alignment with the holes 5, 5 in the open end 1a of the bag 1 and put into the holes 5, 5. Resultantly, when the port 4 is inserted into the open end 1a to be melt-adhering thereto, as the open end 1a is gathered, the pins 58, 58 are moved along the slots 60, 60 to be brought nearer to each other.

In the longitudinally middle portion of the bag mounting base 53 nearer to one side thereof, there is formed a window 62 (see FIG. 14). From this window 62 is projected a support 66 for a movable frame 65 interconnecting the rods 64, 64 of air cylinders 63, 63 supported on the left end the right sides of the underside of the bag mounting table 53. From this support 66 is horizontally projected a pin-like port holder 67 so as to face the open end 1a of the bag 1 on the bag mounting table 53. The rods 64, 64 are extended and withdrawn to move the movable frame 65 between a port setting position and a port inserting position.

Figure 16A:
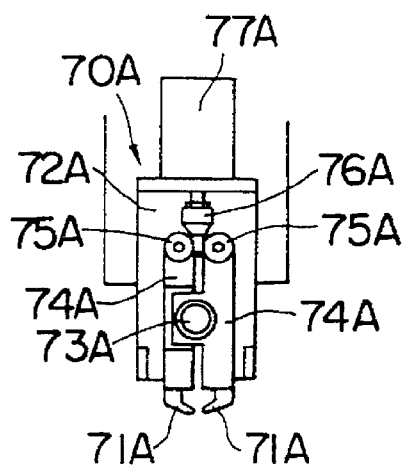
FIG. 16 is front views of one embodiment of means for separating and opening the open end of a bag.
Figure 16B:
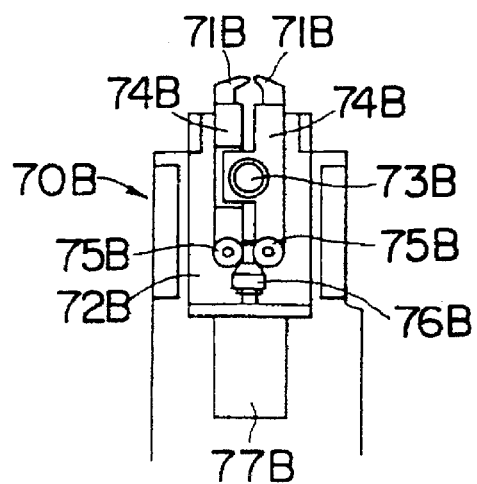

The separating and opening means used in the open end separating and opening step (b) (see FIG. 13) for separating and opening the open end 1a of the bag 1 to receive a port is separating and opening means which, as shown in FIG. 16, pinches the film so that the means can separate and open the open end without failure whether a material of the bag is thick or thin, and even when a width of the opening is small. That is, bifurcated pawl members 70A, 70B are opposed to each other movably to and from each other at an upper and a lower positions across the open end 1a of the bag 1 on the bag mounting base 53. Since both pawl members 70A, 70B have the same structure, only the upper pawl member will be explained. The bifurcated pawl member 70A comprises a pair of rod members 74A, 74A having pawls portions 71A, 71A and having the middle portions openably pivoted on a support member 72A by a pin 73A, a wedge member 76A to be advanced inbetween and withdrawn therefrom, rollers 75A, 75A on the rear ends of the rod members 74A, 74A for opening and closing the rod members 74A, 74A, and an air cylinder 77A exemplified as the driving means for advancing and withdrawing the wedge member 76A.

Figure 17:
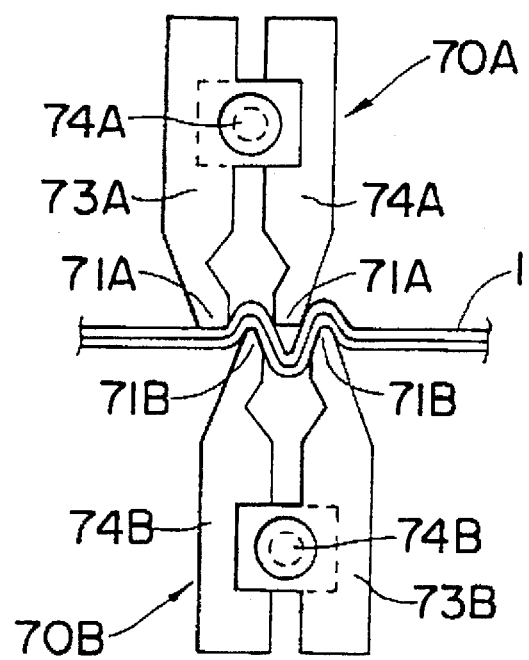
FIG. 17 is an explanatory view of the function of FIG. 16.

A pair of the upper and the lower pawl members 70A, 70B are offset from each other that the pawls 71A, 71A, and the pawls 71B, 71B are are alternately offset from each other as shown in FIG. 17. The pawl 71A of one 70A of the bifurcated pawl members is to be inserted inbetween the pawls 71B, 71B of the other bifurcated pawl member 70B. The pawls 71A, 71A; 71B, 71B are closed when the wedge members 76A, 76B are advanced inbetween the rollers 75A, 75A; 75B, 75B to pinch the films of the bag 1.

Figure 18:
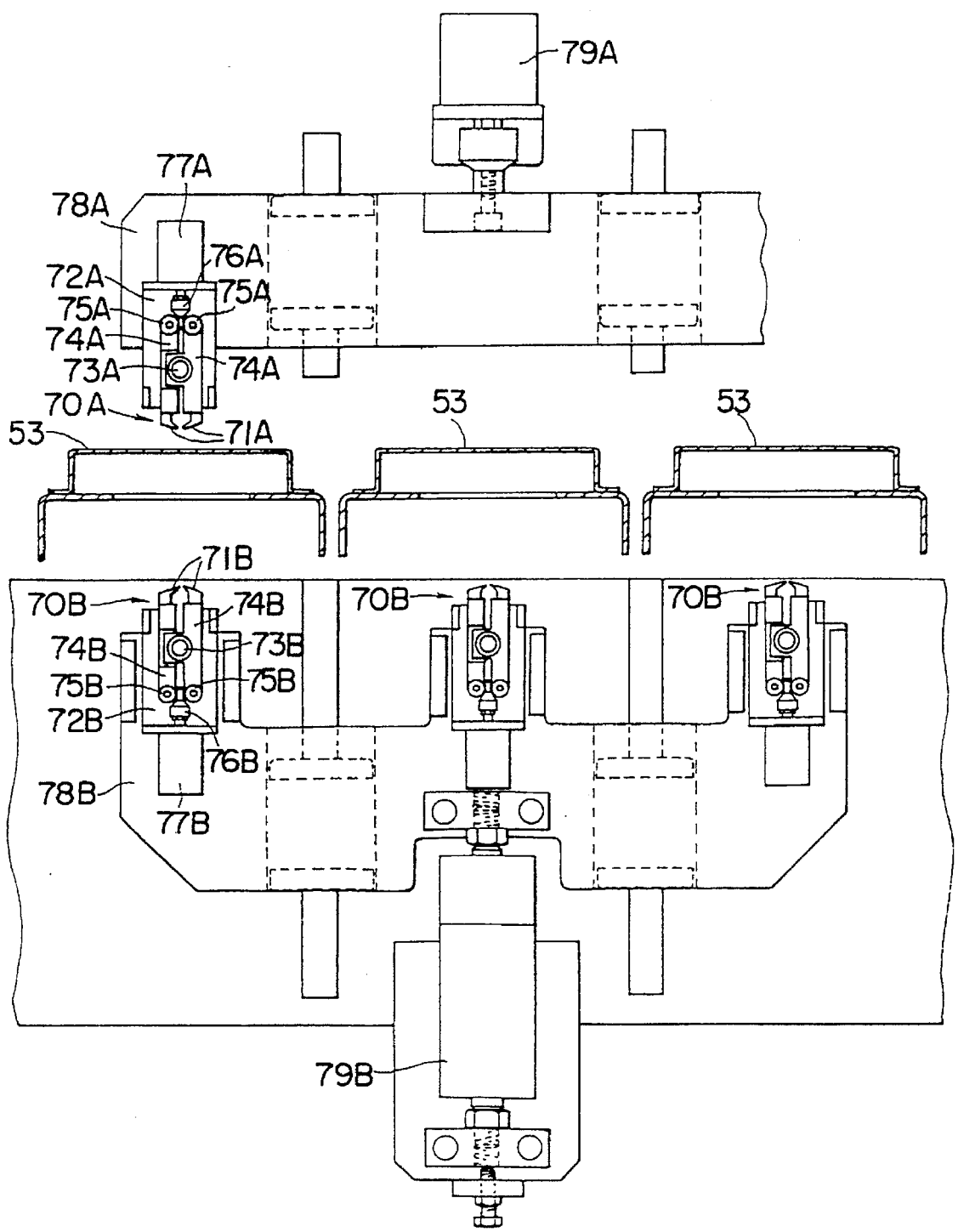
FIG. 18 is a partially omitted front view of the apparatus as a whole including the separating and opening means of FIG. 16.
Figure 19:
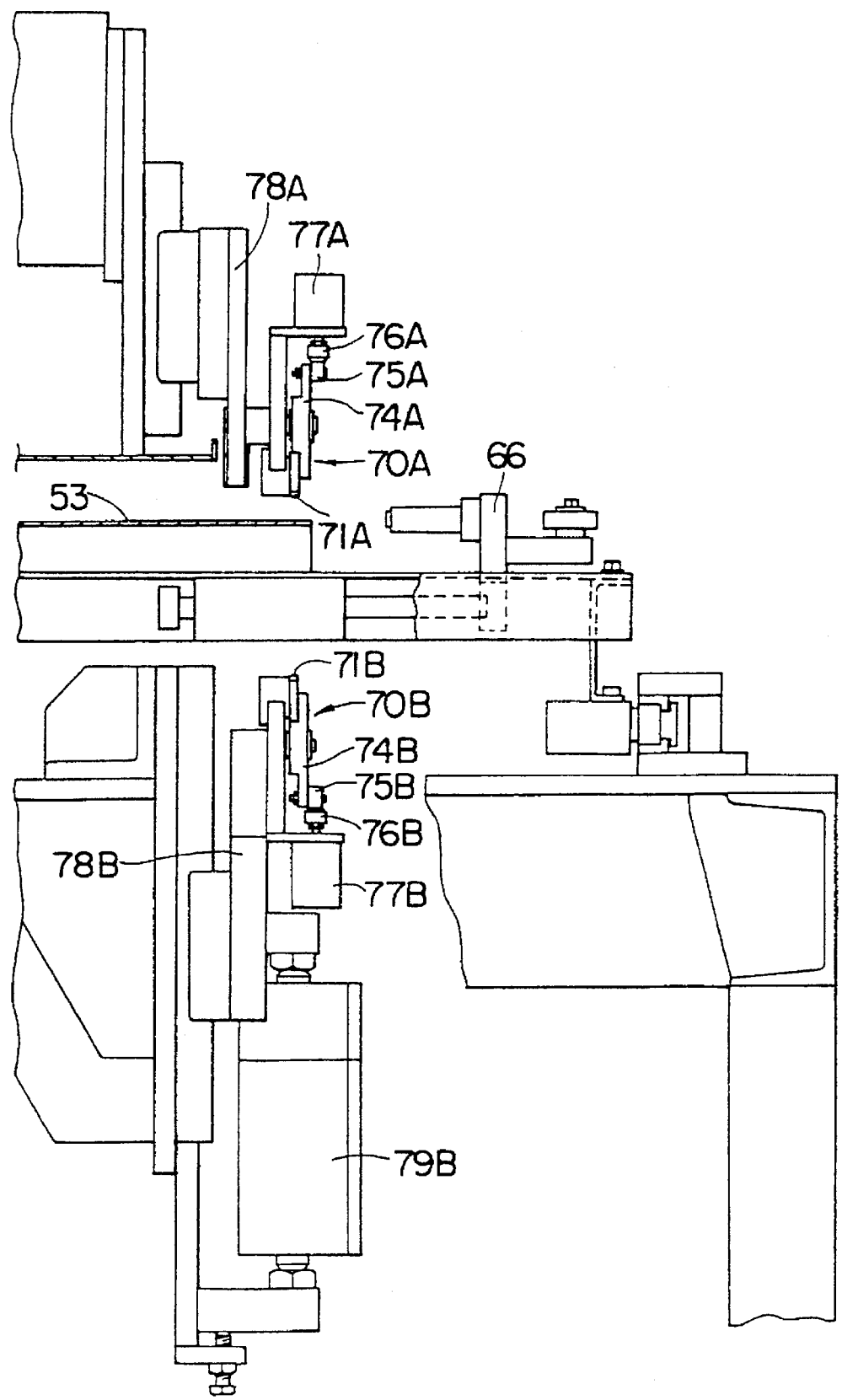
FIG. 19 is a side view of the apparatus of FIG. 18.

FIGS. 18 and 19 show a front view and a side view of an embodiment in which three separate-opening means for separating and opening the open ends of bags 1 of a tubular film involved in this invention.

A pair of an upper and a lower bifurcated pawl members 70A, 70B are mounted respectively on an upper and a lower frames 78A, 78B at the upper limit at the end of each bag mounting table 53 for bags of a tubular film to be mounted on. The frames 78A, 78B are moved to and from each other by air cylinders 79A, 79B as moving means so that the pawls 71A, 71B of the bifurcated pawl members 70A, 70B are brought into contact with the front side and the back side of the open end of the bag on the bag mounting table 53 near the open end.

Figure 20:
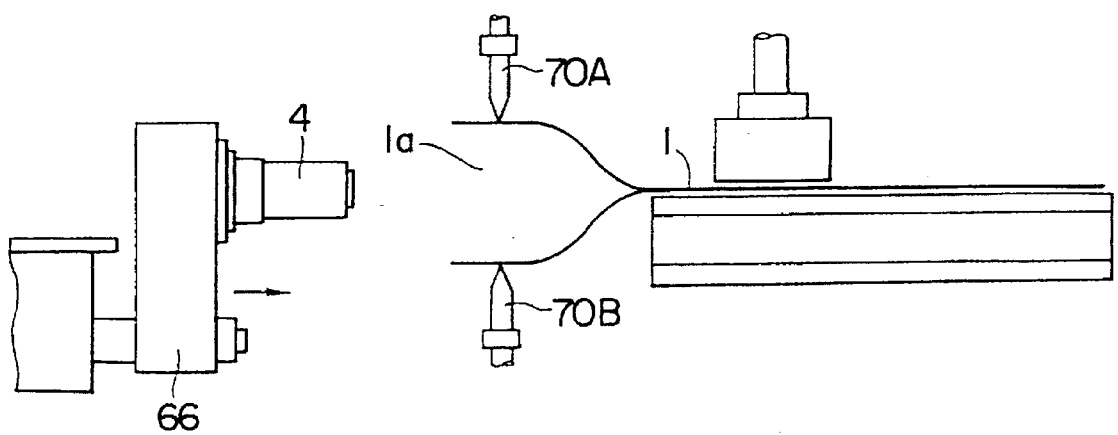
FIG. 20 is a view explaining one way of separating and opening the open end of a bag and inserting a port thereinto.

FIG. 20 shows a state in which, after the open end 1a of the bag 1 is separated and opened, the support 66 for a port 4 is moved in the direction of the arrow to insert the port 4 into the separated and opened end 1a.

Figure 21A:
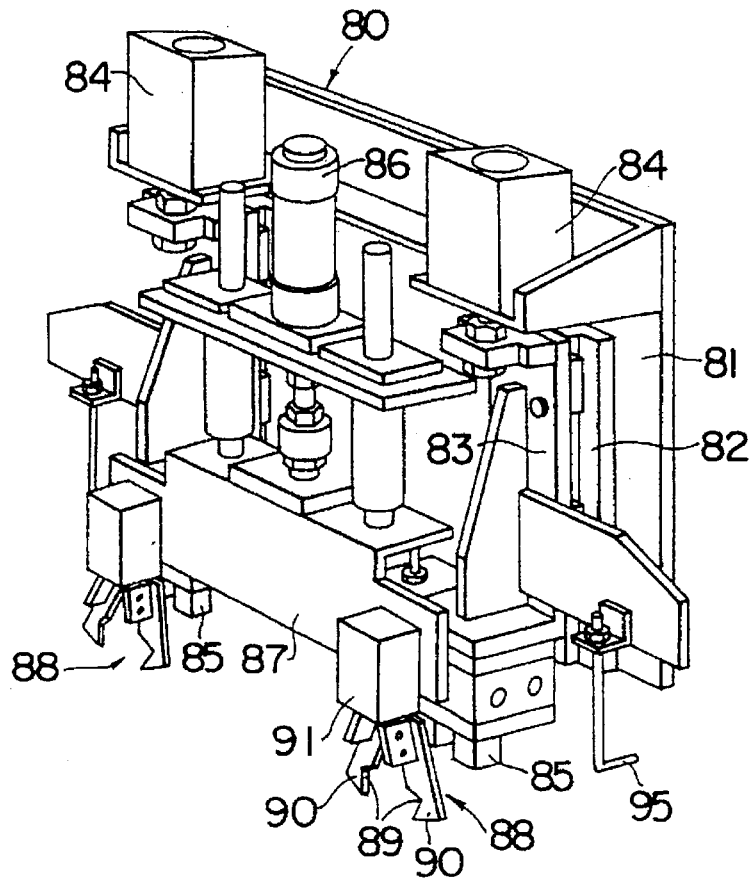
FIG. 21 is perspective views of one embodiment of sealing means.
Figure 21B:
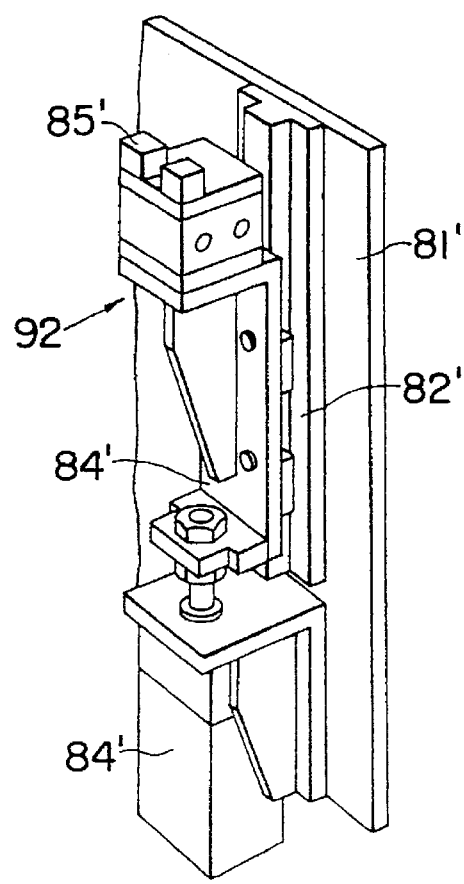
Figure 22:
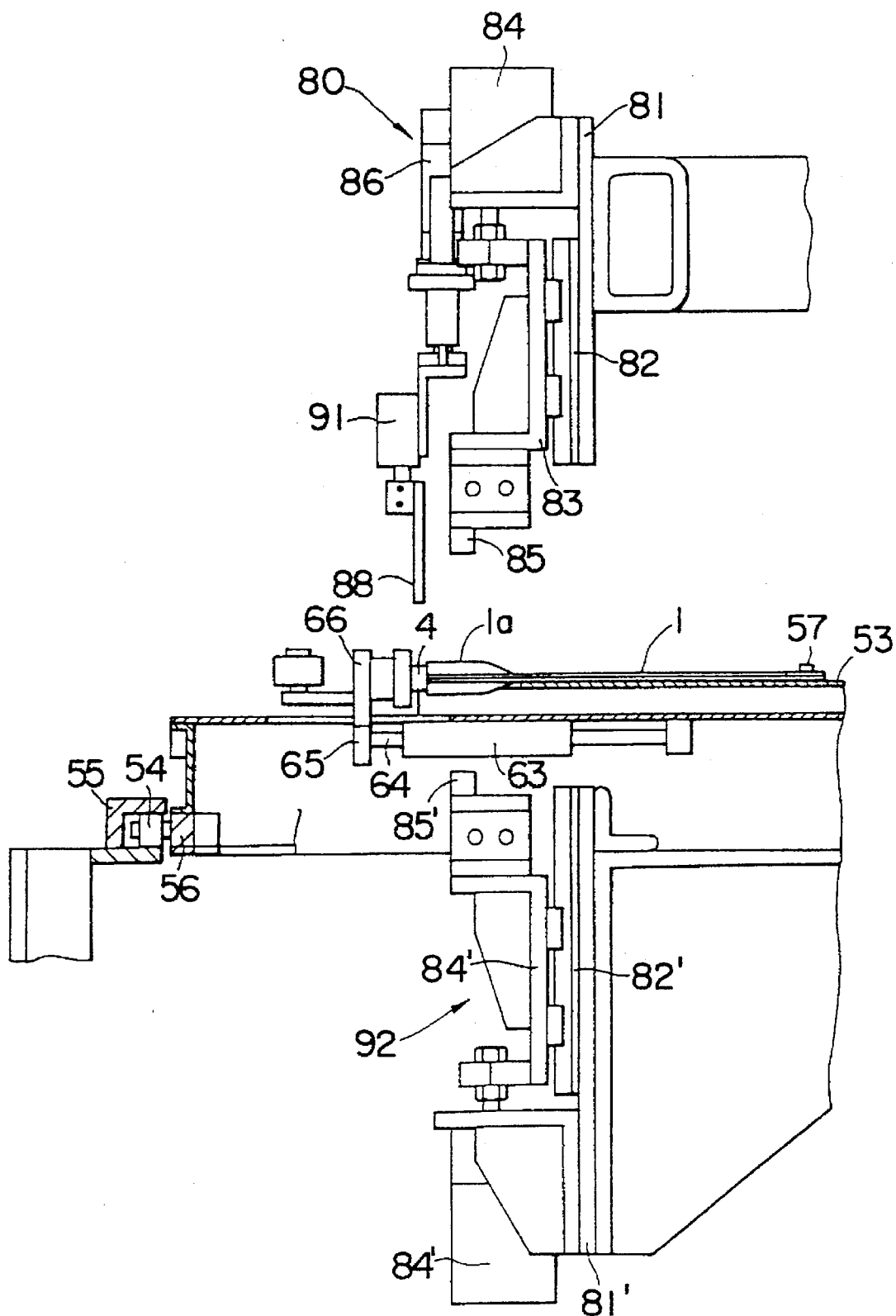
FIG. 22 is a side view of the sealing means of FIG. 21.

Sealing means used in the sides heat-sealing step (d) (the first seal), and in the port heat-sealing step (e) (the second seal) shown in FIG. 13 has the structure of FIG. 21, and FIG. 22 respectively showing a pair of an upper and a lower sealing means, and a side view thereof. That is, the upper sealing means 80 of the pair is cantilevered by means of the frame 83 which is vertically movable along a vertical guide rail on the side of a frame 81 fixedly provided upright. An upper part of the frame 83 is connected to the rod of an air cylinder 84 secured to the frame 81, and a heater 85 is provided on the lower part of the frame 83. The heater 85 is disposed corresponding to a port inserting position of the bag 1 on the bag mounting table 53. A port centering means 66 is mounted on a frame 87 which is ahead of the heater 85 and is vertically moved by an air cylinder 86 independently of the frame 83.

The port centering means 88 includes a pair of levers 90, 90 each having a V-shaped groove 89, 89 formed in a surface opposed to that of the other lever 90. The groove receives a substantially half of a peripheral surface of a port 4. The levers 90, 90 are opened and closed by a handle cylinder 91. A lower neck portion of the port 4 near the outer end is held between the grooves 89, 89 of both levers 90, 90, so that the port 4 is located at a set position and hold the port 4 still during a heat-sealing operation. This holding mechanism may be any, as long as the port 4 can be centered and hold the port at a set position.

The lower sealing means 92 has the same structure as that of the heater 85 of the upper sealing means 80. The members of the lower sealing means 92 are indicated by prime reference numerals if their corresponding members of the upper sealing means 80, and the lower sealing means 92 is not explained.

Figure 23:
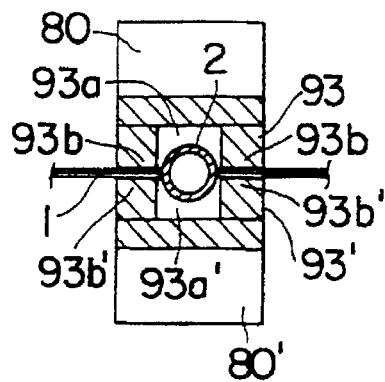
FIG. 23 is a side view of a relationship between heaters used in a first sealing unit for sealing those parts of the open end of a bag on both sides of a port.
Figure 24:
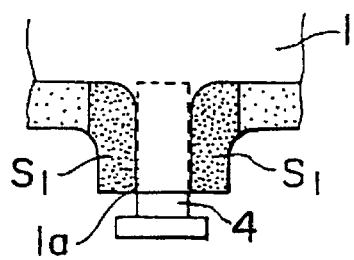
FIG. 24 is a view explaining a heat-sealing region of the heaters of FIG. 23.

A heater 93 for sides sealing included in the heater 85 of the sealing means 80, 92 used in the sides heat-sealing step (d) has, as shown in FIG. 23, a bracket-shaped concavity 93a which loosely receives the barrel portion of the port 4, and heating portions 93b, 93b for heat-sealing a set parts S1, S1 on both sides of the port inserting position of the bag 1 as shown in FIG. 24. The heat does not reach the barrel portion of the port 4.

Figure 25:
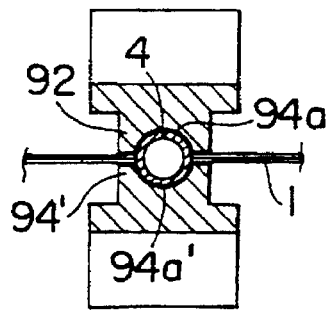
FIG. 25 is a view explaining a relationship between a port and heaters used in a second sealing unit for sealing those parts of the open end of a bag corresponding to a peripheral surface of a port.
Figure 26:
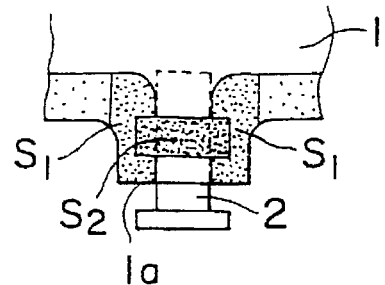
FIG. 26 is a view explaining a heat-sealing region by the heaters of FIG. 25.
Figure 27:
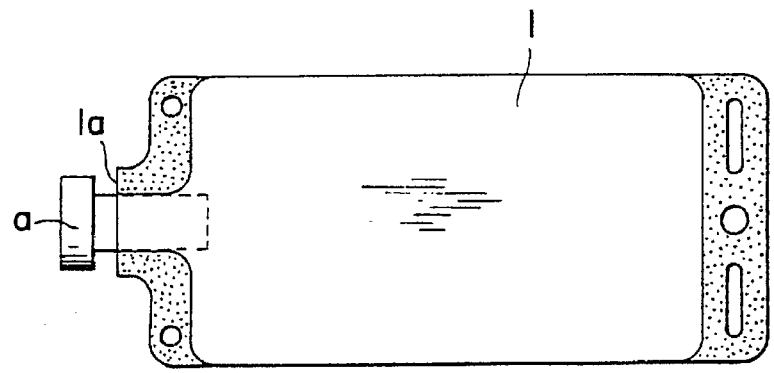
FIG. 27 is a plan view of one example of a tubular plastic film bag intended by this invention.
Figure 28:
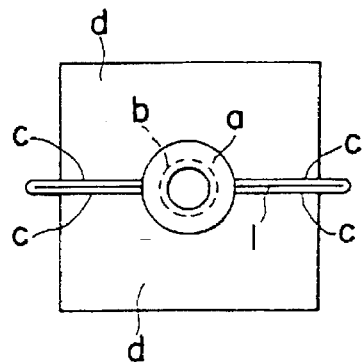
FIG. 28 is an explanatory view of conventional heat-sealing means.

A heater 94 of the sealing means used in the port heat-sealing step (e) has, as shown in FIG. 25, a semi-circular concavity contouring to a peripheral surface of a part of the port 4 to be inserted. The inside peripheral surface of this concavity is a heating portion 94a for heat-sealing a set part S2 of the peripheral surface of the inserted port 4 in the separate opened end 1a of the bag 1 as shown in FIG. 26.

In FIG. 21(A), reference numeral 95 indicates a bag presser provided upright on the frame 83 supporting the heater 85. The bag presser 95 presses the bag 1 at a required portion thereof when the frame 83 is lowered so as to prevent the displacement of the bag 1 upon heat-sealing, and presses the bag 1 so that the bag 1 is removed from the pins 57, 58 when the heater 85 leaves apart from each other following a heat-sealing operation.

The above-described sealing means 80, 92 may each include at least one pair of the heater 93 for heat-sealing the sides, and the heater 94 for heat-sealing the port, so as to achieve its function. However, it is possible that three sealing means 80, 92 disposed along the moving track of the bag mounting base 53 (the first seal), and three sealing means for the port heat-sealing step (e) (the second seal), which are serially arranged, whereby bags can be sealed simultaneously by the unit of 6 bags. The number of installed sealing means is optional.

The function of the above-described embodiments will be explained hereinafter.

A tube roll 6 is set in the tubular film feed unit 7 as shown in FIG. 3. The tubular film 2 is fed out through the dancer roll, is passed inbetween the heat-sealing members 19, 19 of the respective heat-sealing means 15, 15, . . . of the heat-sealing unit 8. Then the air cylinders 22, 22 are actuated to bring the heat-sealing members 19, 19 to each other (see FIG. 6). The tubular film 2 is held between the surfaces 21a, 21a of the heaters 21, 21 of the heat-sealing members 19, 19 to be heat-sealed, and heat-seals 3, 3 are formed at set positions of the tubular film 3.

That is, when the tubular film 2 is horizontally conveyed between the upper and the lower heat-sealing members 19 of the heat-sealing means 15, 15, . . . , the air cylinders 50, 50 of the lower film positioning members 48, 48 are actuated to extend the rods 51, 51, and the positioning plates 52, 52 at the forward ends of the rods 51, 51 are advanced to set positions below the tubular film 2, while the air cylinder 22 of the lower heating member 19 is actuated (see FIG. 10). At the same time, the air cylinder 22 of the upper heat-sealing member 19 is actuated to lower the heat-sealing member 19. Together therewith, the film pressing members 41, 41 are also lowered to come into contact with the tubular film 2 and hold the tubular film at both sides of positions thereof to be heat-sealed between the lower positioning plate 52, 52 and the upper pressing plates 43, 43. Then the heaters 21, 21 are moved to each other to come into contact with the top side and the underside of the tubular film 2. Heat-seals are formed in accordance with their sealing pattern.

When the heat-sealing operation is over, the air cylinders 22, 22 of the heat-sealing members 19, 19 are withdrawn to leave the heat-sealing members 19, 19 from the tubular film 2. At this time, the upper film pressing members 41, 41, and the lower positioning members 48, 48 are holding both sides of the heat-sealed portions, so that the film 2 is prevented from sticking to the heaters 21, 21, and being pulled or displaced when the heaters 21, 21 leave the film 2 apart.

At the time that the upper heater 21 has left the tubular film 2, the rods 42, 42 of the film pressing members 41, 41 are raised, accompanied by the heater base 20, and the pressing plates 43, 43 thereof leave the film 2 to return to their initial positions. At the time that the lower heater 21 has left the film 2, the air cylinders 50, 50 withdraw, and the positioning plates 52, 52 are lowered to their initial positions.

Heat-sealing operation on the tubular film 2 is therefore completed, and the film 2 is conveyed by a set length. A portion of the tubular film 2 to be heat-sealed is then supplied between the heat-sealing members 19, 19 of the heat-sealing means 15, 15, . . . to be heat-sealed by the same operation.

In the above-described embodiment, the tubular film 2 is horizontally conveyed to be heat-sealed. However, needless to say, it is possible that the tubular film 2 is vertically conveyed, and the heat-sealing members 19, 19 are disposed on both sides of a path of the conveyance, whereby this invention can be practiced. In the case where the tubular film 2 is thin, it is possible to omit the lower heat sealing member 19 and the film positioning member 48, and the heater base alone is used. Furthermore, the structures of the film pressing member 41 and the film positioning member 48 are not limited to the shown embodiments, and in short, they can be any as long as they can hold both sides of the heat-sealed portions by the heaters 21, 21.

Following heat-sealing operation, the air cylinders 22, 22 withdraw the rods 23 to separate the heat-sealing members 15, 15 apart. Then, with the cooling sandwiching members 33, 33 of the cooling means 25 of the cooling unit 9 separated from each other, the air cylinders 29, 29 are actuated to advance the base 27 to the heat-sealing means 15, whereby the movable member 28 as well is advanced to intrude the cooling sandwiching members 33, 33 inbetween the heat-sealing members 19, 19 (see FIG. 8). The air cylinders 36, 36 are operated so that the heat seals 3, 3 of the tubular film 2 between the cooling sandwiching members 33, 33 are held therebetween.

Then, when the threaded rod 31 is rotated clockwise by the motor 32, all the cooling means 25, 25 are moved downstream from the region of the heat-sealing unit 8 with the heat-seals of the tubular film 2 held between the cooling sandwiching members 33, 33, and are stopped at set positions outside the heat-sealing unit 8. Then a fresh portion of the tubular film 2 is placed in the heat-sealing unit 8 and heat-sealed by the heat-sealing means 15, 15 in the same way as described above. During this heat-sealing operation, the cooling sandwiching members 33, 33 of the cooling means 15, 15, . . . are separated to release the tubular film 2, and after the movable members 28 have withdrawn by the air cylinders 29, 29, the threaded rod 31 is rotated counterclockwise to return the cooling sandwiching members 33, 33 to their position opposite the heat-sealing unit 8 and are ready to receive the heat-seals 3, 3, of the tubular film 2 heat-sealed by the heat-sealing means 15, 15, . . .

The above-described operation is thus repeated to convey downstream to the next step the tubular film 2 heat-sealed at a plurality of positions, without elongating the softened parts of the heat-seals, while cooling the heat-seals by holding the heat-seals between the cooling sandwiching members 33, 33 of the cooling means 25.

The tubular film 5 which has been conveyed downstream from the cooling means 25, 25 is punched at the heat-seals 3, 3 by punching and cutting means 11. The tubular film 2 is then cut by the unit of three bags. Cut tubular films 2 are arranged in two rows by the double-row arranging unit 12 and is conveyed in two rows. The tubular film 2 is then cut into individual bags, and the individual bags are shaped and fed to the conveying unit 14. Then the bags are fed in a horizontal row to the port inserting and melt-adhering unit.

The thus-formed bags 1 are fed onto the bag mounting table 53, and are so positioned that the pins 57, 58, 58 are inserted into the holes 5, 5, 5, while a port 4 is put around the port holder 67 as shown in FIG. 13. The feed and setting of the bag 1 and the port 4 can be automated manually or mechanically.

When the bag-mounting table 53 with the bags 1 set on arrives at the position of the open end separate-opening step (b) and stopped, the support members 72A, 72B of the upper and the lower pawls 70A, 70B are moved nearer to each other by the operation of the air cylinder 79A, 79B, and the pawl portions 71A, 71A; 71B, 71B of the bifurcated pawls 70A, 70B are brought into contact with the front and the back sides of the separated and opened end 1a of the bag 1. As shown in FIG. 17, the pawl portions 71A, 71A; 71B, 71B of the bifurcated pawls 70A, 70B are brought into the offset engagement with each other. That part of the film is accordingly undulated. Then, the air cylinders 77A, 77B are operated to move the wedge members 76A, 76B inbetween the rollers 75A, 75A; 75B, 75B, whereby the pawl portions 71A, 71A; 71B, 71B are closed. As a result, the undulated front and the back sides of the film are grasped by the pawl portions 71A, 71A; 71B, 71B of the bifurcated pawls 70A, 70B, and after the pawl portions have perfectly grasped, the support members 72A, 72B are moved to leave each other, and the open end of the bag 1 is separated and opened.

After the open end 1a is separated and opened, the air cylinders 63, 63 are withdrawn to move the movable frame 66 toward the bag 1, and a port 4 supported on the outer periphery of the port holder 67 is inserted into the separated and opened end 1a together with the port holder 67 by a set depth. Then, the hand cylinder 91 is extended to lower the centering means 88. The lower neck portion of the port 4 is positioned between the grooves 89, 89 of the levers 90, 90 of the centering means 88. The hand cylinder 91 is operated to close the levers 90, 90, and the holder 4 is held between the grooves 89, 89, and the port is held centered therebetween.

Subsequently, the air cylinders of the upper and the lower sealing means 80, 92 are operated to move the frames 83, 83' near to each other, and the respective heaters 85, 85' are brought over the port 4 inserted in the separated and opened end 1a with the heaters 93b, 93b in contact with the upper and the front and the back surfaces of the bag 1, and the set regions S1, S1 on both sides of the port 4 are heat-sealed. At this time, that part of the film 1 at the open end 1a is drawn left and right, but the part of the film with the port inserted in and which is not heat-sealed, freely elongates or shrinks, and neither pin-holes nor breakage occur.

When the heat-sealing on both sides of the port 4 is completed, the heaters 85, 85' return, and the centering means 88 releases the port 4 and return upward. Then the bag-mounting base 53 is moved to proceed to the next port heat-sealing step (e).

In this step, the set region S2 of the film corresponding to the peripheral surface of the port 4 is heat-sealed by sealing means of the same constitution as the sealing means 80, 92, using the heaters 94, 94' of FIG. 25. And the heat-sealing of the open end 1a is completed. In a set period of time following or preceding the completion of the heat-sealing, the air cylinders 63, 63 of the bag-mounting table 53 are extended to withdraw the movable frame 65 and pull the port holder 67 out of the port 4. The bag-mounting table 53 is further advanced to discharge the finished bag. The empty bag-mounting table 53 is circulated back to the initial position by the endless circulation of the toothed belts 56, 56 to be used in the above-described steps.

As described above, according to this invention, a tubular film is conveyed downstream with the heat-seals formed by the heat-sealing unit press-held by the cooling sandwiching members of the cooling unit. Consequently the tubular film can be conveyed without elongation and shrinkage even when the film is heated to soften when heat-sealed. The heat-seals of the conveyed tubular film are cooled off. Consequently in cutting the tubular film into bags following the conveyance, no deflections occur in their cutting positions. Precise and accurate treatments including punching can be made to the bags and mass-production of uniform bag-shaped containers with high precision is possible.

The film pressing member for pressing both sides of the tubular film at heat-sealing positions near the heaters of the heat-sealing means. It does not happen that the film sticks to the heaters adversely to be deflected or elongated. Eventually, the film does not zigzag when conveyed, and in the film punching and cutting process following the heat-sealing, dimensional errors can be substantially eliminated. The film pressing can be more secured and the film displacement can be further prevented by pressing the film before the heat-sealing, and releasing the film after the heaters have been withdrawn. By disposing the film positioning means corresponding to the film pressing means, in conveying the film airborne, the film can be held accurately at heat-sealing positions. This is very effective to heat-seal thick tubular films which need the heat-sealing on both surfaces.

The open end of a bag of a lay-flat tubular film is separated and opened by contacting the pawl portions of a pair of bifurcated pawls in an offset state with respect to each other to the front and the back surfaces of the bag thereby undulating the bag, and grasping the associated summits of the undulation by the pawl portions of the respective pawls. Consequently, in comparison with the conventional separate-opening by suction with vacuum pads, even if the bag is thick or has a narrow opening width, the open end of the bag can be separate-opened without failure. Furthermore, less error occurs in determining a separating and opening position, and which causes no trouble in the following steps of, e.g., inserting a port. The device itself can be so compact that the device can be easily incorporated in an automatic production line for producing bag-shaped containers of a tubular film on line. Thus, various advantageous effects can be provided.

Following the heat-sealing of the both sides of a port inserted in the open end of a bag, the peripheral portion of the port is heat-sealed. Consequently, neither awkward tensile strength nor local elongation takes place in that part of the film of the open end of the bag. No pin-holes, wrinkles, breakage, etc. take place. This increases the safety of the bag as a transfusion bag.

What is claimed is:

1. A bag making apparatus for forming bags from a continuous tubular plastic film the apparatus comprising:

heat-sealing means for sealing the tubular film widthwise at given positions thereof, said heat-sealing means including a pair of heat-sealing members which are disposed on one side of a track of conveyance to the tubular film, opposing each other so as to hold the tubular film therebetween, and are movable to and from each other;

driving means for driving the heat-sealing members to and from each other;

cooling means for cooling the tubular film including a pair of cooling sandwiching members which are supported on a movable member disposed movably in directions of width of the tubular film and conveyance thereof, and intrude in-between the heat-sealing members; and driving means for driving the cooling sandwiching members to and from each other, whereby the tubular film is conveyed by a movement of the movable member to a next step while the heat-seals are sandwiched by the cooling sandwiching members.

* * * * *